United States Patent
Bryan et al.

(10) Patent No.: US 9,216,753 B2
(45) Date of Patent: Dec. 22, 2015

(54) UTILITY CART WITH ROTATABLY SECTIONED CENTER SHELVES

(71) Applicants: Patrick J. Bryan, Grant-Valkaria, FL (US); Dawn R. Bryan, Grant-Valkaria, FL (US); Clark L. Colbert, Palm Bay, FL (US); April D. Colbert, Palm Bay, FL (US)

(72) Inventors: Patrick J. Bryan, Grant-Valkaria, FL (US); Dawn R. Bryan, Grant-Valkaria, FL (US); Clark L. Colbert, Palm Bay, FL (US); April D. Colbert, Palm Bay, FL (US)

( * ) Notice: Subject to any disclaimer, the term of this patent is extended or adjusted under 35 U.S.C. 154(b) by 0 days.

(21) Appl. No.: 14/547,952

(22) Filed: Nov. 19, 2014

(65) Prior Publication Data

US 2015/0191191 A1 Jul. 9, 2015

Related U.S. Application Data

(60) Provisional application No. 61/924,027, filed on Jan. 6, 2014.

(51) Int. Cl.
*A47B 57/00* (2006.01)
*B62B 3/02* (2006.01)

(52) U.S. Cl.
CPC ........................................ *B62B 3/02* (2013.01)

(58) Field of Classification Search
CPC ............ B62B 3/02; B62B 3/002; B62B 3/004
USPC ............ 280/47.35, 651, 79.11, 79.2; 108/139
See application file for complete search history.

(56) References Cited

U.S. PATENT DOCUMENTS

| | | | | |
|---|---|---|---|---|
| 5,842,425 A * | 12/1998 | van der Aa | ...................... | 108/64 |
| 6,161,487 A * | 12/2000 | Chang | ......................... | 108/50.01 |
| 6,767,019 B2 * | 7/2004 | van Hekken | ............... | 280/47.35 |
| 6,877,442 B2 * | 4/2005 | Helle | ............................ | 108/147 |
| 8,814,199 B2 * | 8/2014 | Shindelar et al. | ............. | 280/651 |
| 8,839,724 B2 * | 9/2014 | Allen et al. | ..................... | 108/92 |
| 2009/0230069 A1 * | 9/2009 | Naden et al. | .................. | 211/144 |
| 2009/0320724 A1 * | 12/2009 | Walburn | ...................... | 108/142 |
| 2012/0205333 A1 * | 8/2012 | Sagel | ......................... | 211/86.01 |
| 2014/0217690 A1 * | 8/2014 | Schumaker et al. | ....... | 280/47.35 |

\* cited by examiner

*Primary Examiner* — John Walters
*Assistant Examiner* — Brian Swenson
(74) *Attorney, Agent, or Firm* — McHale & Slavin, P.A.

(57) ABSTRACT

A utility cart having individually rotatable shelves on each corner post, whereby each shelf is constructed and arranged to adjoin together to form a center interior shelf in horizontal disposition between pairs of corner posts, is disclosed herein. The utility cart includes a top shelf and a bottom shelf supported in a separated state by four corner posts. A center shelf is provided in the form of four individual shelves each rotatably secured to one of the corner posts to be rotatable thereabout. The center shelves may be rotated to fit within the confines of the cart to function as a single shelf similar to the upper and lower shelves, or they may be positioned in pairs adjacent each other and extending beyond the end(s) of the cart or individually anywhere in between.

17 Claims, 4 Drawing Sheets

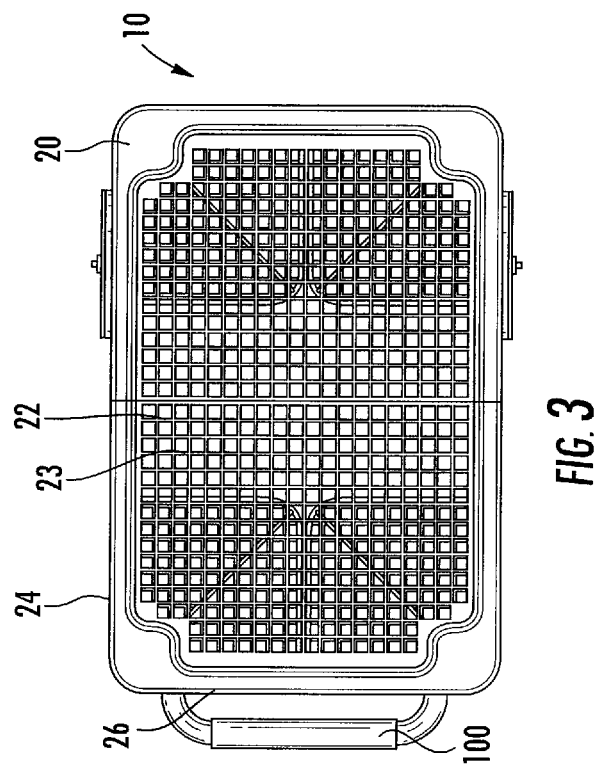
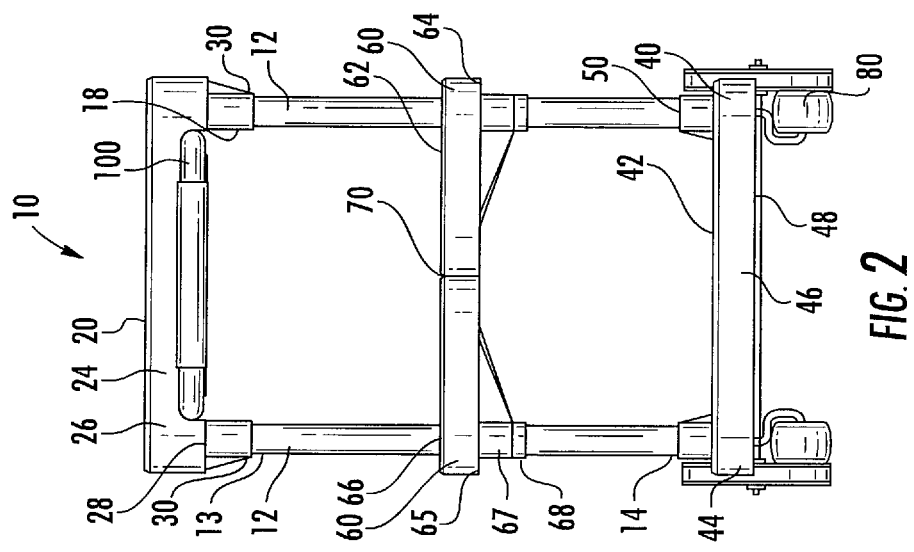

UTILITY CART WITH ROTATABLY SECTIONED CENTER SHELVES

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 61/924,027, entitled "UTILITY CART WITH ROTATABLY SECTIONED CENTER SHELVES", filed Jan. 6, 2014. The contents of the above referenced application is incorporated herein by reference in its entirety.

FIELD OF THE INVENTION

This invention relates generally to the field of utility carts and, in particular, to a utility cart having individually rotatably shelves on each corner post.

BACKGROUND OF THE INVENTION

Utility carts are used as a mechanism for transporting or storing almost any type of products, parts, or items such as tools, books, mail, plants, machinery, equipment, or personal possessions, able to fit on their surface area. Utility carts have long been used in hospitals, medical offices, business offices, manufacturing plants, restaurants, hotels, libraries, and private residences. The most popular models include kitchen carts, mobile food carts, rolling filing carts, tool carts, stainless steel carts, book carts, plastic utility carts, and wire shelving carts.

Bin carts or tub carts are useful for storing or transporting products. Those with easily sliding tubs are especially useful on assembly and production lines. Use of the correct bin or tub utility cart will most certainly improve productivity and can help avoid costly worker's compensation claims. Book carts are used to store or transport books, manuals, magazines, and literature. Slanted shelves that help to keep books in place during transport offer multiple shelf options, depths, and styles. File utility carts are used to store, organize, and transport various types of files. Mobile file carts simplify the process of moving files from office to office and protect employees from the strain of lifting large quantities of records. Mobile file carts that can be used to store items other than files may come with work surfaces, shelves, drawers, baskets, or locking lids. Similarly, mail utility carts make it easy to transport valuable mail, packages, and documents essential to related businesses. Popular features of these may include removable baskets for loading and sorting, as well as file rails for hanging files. Stainless steel, chrome, or galvanized utility carts are designed to resist corrosion and rust damage, and are popular where moisture is a problem or clean up is required. They are most often used in hospitals, labs, physician offices, hotels, and restaurant preparation and/or serving areas. Tool utility carts include features to support a plurality of tools in a position to enable easy access to tools by a mechanic or other person engaged in activities which require the selected use thereof.

The most popular and versatile utility cart is the plastic utility cart. Plastic utility carts are good for storing or transporting products, and are most often used by maintenance personnel and/or in janitorial services, hospitals, restaurants, automotive service centers, commercial businesses and home environments. Most plastic utility carts are made of polyethylene, which makes them durable and easy to clean as well as rust, stain, and dent resistant. Plastic utility carts are typically general purpose carts with top shelves adjustable to different height levels. Some utility carts even offer adjustability of lower shelves. These carts are readily movable, often being supported on casters wheels, which enables them to be moved from location to location or room to room, thus enhancing their versatility. Generally the carts come in various sizes, enabling transport of different types of equipment and office supplies. As a general rule, these carts are of different overall design in order to accommodate these various needs.

As a result, various utility carts exist with specialized designs to improve, accommodate, or advance the convenience for users. For instance, U.S. Pat. No. 5,971,512 discloses an "Outrigger Supported Utility Cart". The utility cart includes a box construction supported with a set of caster wheels for mobility. Additionally, the cart includes a vertical shaft which supports one or more trays. The trays are positionable vertically on the shaft, and are also rotatable with the shaft so as to be positioned conveniently for reaching tools and parts placed thereon. An outrigger support is attached to and movable with the vertical shaft, thereby providing a utility cart having a rotationally mounted shaft with a means for countering the off-center weight of the cantilevered tray which is positioned lateral to the cart.

U.S. Pat. No. 5,588,659 discloses a "Tool Cart" generally in the form of an upright stand having a workbench secured on an upper surface of a tubular frame. A support member extends vertically upward from the workbench to support a plurality of pivoting tool supports. This construction allows the user to extend the tool supports outwardly for access to the tools while the upper surface of the workbench remains fully accessible.

U.S. Pat. No. 6,767,019 discloses an "Ergonomic Utility Cart". The utility cart includes a bottom shelf and an upper shelf separated by four support posts which may vary in length to create carts of different heights. A vertically adjustable tray support arm mounts a support tray in close proximity to the utility cart. The tray support arm includes a vertical member which is inserted through the top shelf and into the support post and is frictionally secured thereto by a spring-loaded wedge assembly. An articulated arm is rotatably mounted to the vertical member at one end, and rotatably mounted to a support tray at an opposite end. The interior of the utility cart between the top and bottom shelves may be left exposed and accessible, or may be enclosed by a plurality of panels and door assembles.

U.S. Pat. No. 5,588,659 discloses a utility cart having pivotal tool supports; U.S. Pat. No. 5,971,512 discloses a utility cart having shelves on an outrigger; and U.S. Pat. No. 6,767,019 discloses a utility cart having a pivotable shelf on an outrigger. The need for a utility cart having rotatable shelves is evident in the prior art. However, what is lacking in the art is a utility cart having individually rotatable shelves on each corner post, whereby each shelf is constructed and arranged to adjoin together to form a pair of center interior shelves in horizontal alignment between pairs of corner posts.

SUMMARY OF THE INVENTION

A utility cart having individually rotatable shelves on each corner post, whereby each shelf is constructed and arranged to adjoin together to form a center interior shelf in horizontal disposition between pairs of corner posts, is disclosed herein. The utility cart includes a top shelf and a bottom shelf supported in a separated state by four corner posts. A center shelf is provided in the form of four individual shelves each rotatably secured to one of the corner posts to be rotatable thereabout. The center shelves may be rotated to fit within the confines of the cart to function as a single shelf similar to the upper and lower shelves, or they may be positioned in pairs adjacent each other and extending beyond the end(s) of the cart or individually anywhere in between.

Accordingly, it is a primary objective of the instant invention to provide a utility cart whereby each of the individually rotatable shelves may be rotated and positioned as desired around a respective corner post to allow the user to customize the cart.

It is a further objective of the instant invention to provide a utility cart having a center portion comprised of a pair of center shelves whereby the individually rotatable shelves on each corner post may be positioned in pairs adjacent each other. In a secondary embodiment, the utility cart provides a center shelf which functions as a single shelf whereby the individually rotatable shelves on each corner post are adjoined together.

It is another objective of the instant invention to provide a utility cart having individually rotatable shelves that each extend beyond the end(s) of the cart.

It is yet another objective of the instant invention to provide shelving having an open corrugated pattern for better ventilation and allowing for greater visibility of stored products.

It is still further an objective of the instant invention to provide a utility cart which may be constructed from various different materials corresponding to the end use of the cart.

It is an additional objective of the instant invention to provide a utility cart having wheels in various arrangements that can be secured to the lower shelf or corner posts to allow the cart to be easily moved. Furthermore, each pair of wheels may be of different sizes to help with ease of cart movement.

It is yet another additional objective of the instant invention to provide a utility cart having an ergonomic handle on the top shelf to aid the user in pushing the cart.

It is further an objective of the instant invention to provide a utility cart that is easily assembled and disassembled without the use of complicated tools.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 2 is a back view of the instant invention;
FIG. 3 is a top view of the instant invention.

DETAILED DESCRIPTION OF THE INVENTION

Figure 1:
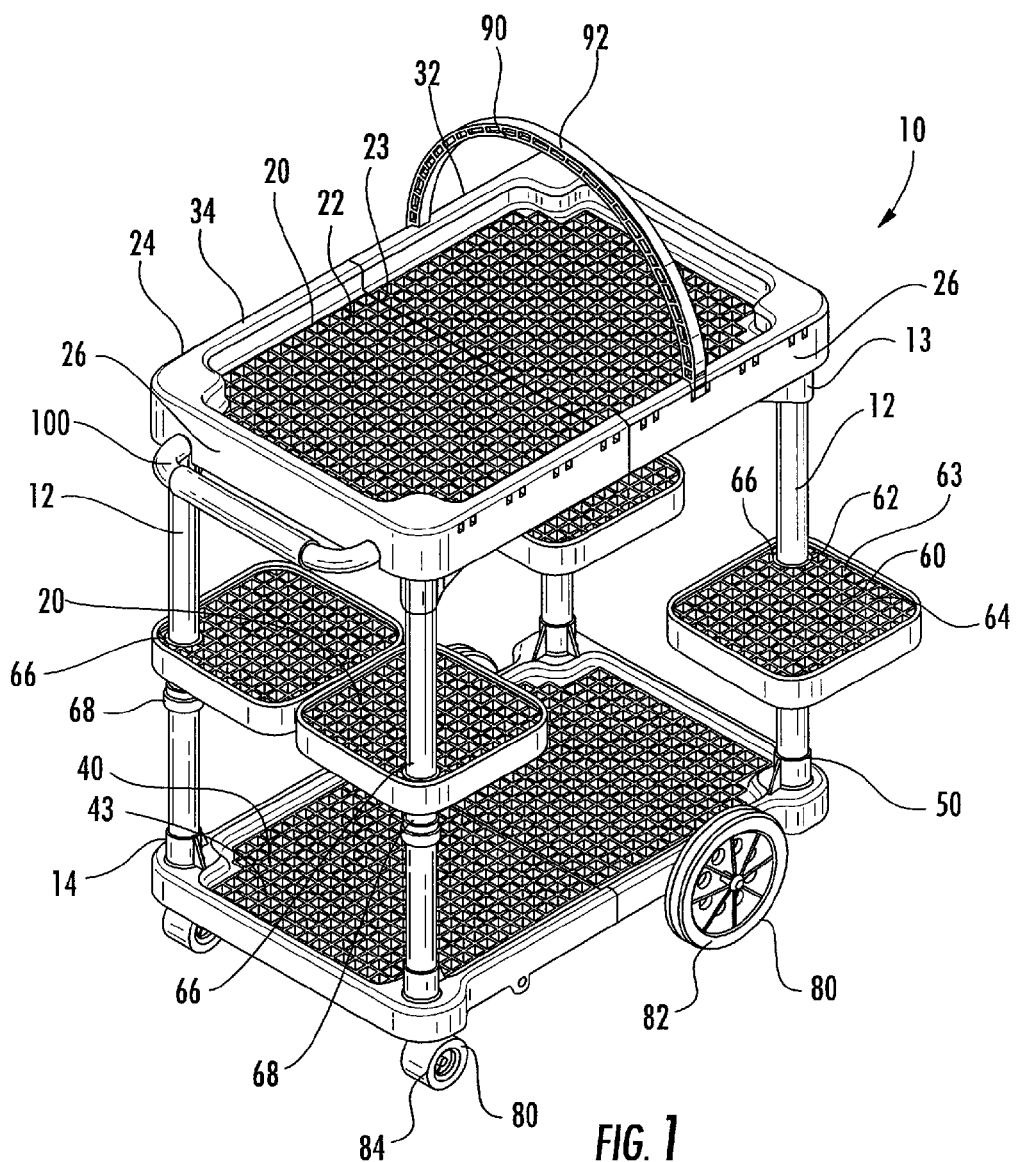
FIG. 1 is a perspective view of the instant invention.

Referring generally to FIGS. 1-5, in which similar reference characters denote similar elements throughout several views, a utility cart 10 having individually rotatable shelves 60 on each corner post 12, is described whereby each shelf 60 is constructed and arranged to adjoin together to form a pair of center interior shelves 70 in horizontal disposition between pairs of corner posts 12. The utility cart 10 includes a top shelf 20 and a bottom shelf 40 supported in a separated state by four corner posts 12. A pair of center interior shelves 70 is provided in the form of four individual shelves 60, each rotatably secured to one of the corner posts 12 to be rotatable thereabout. In a preferred embodiment, the center interior shelf 70 is comprised of a pair of individual shelves 60 on each corner post 12 positioned in pairs adjacent each other. In a secondary embodiment, the center shelves may be rotated to fit within the confines of the cart to function as a single center shelf (not shown) similar to the upper and lower shelves. In a preferred embodiment, the utility cart is constructed of polyethylene, which makes the cart durable, easy to clean, and lightweight as well as rust, stain, and dent resistant. However, it is contemplated that the utility cart may be constructed from various different materials corresponding to the end use of the cart.

As shown in FIGS. 1-4, each shelf, the top shelf 20, bottom shelf 40, and each individually rotatable shelf 60, on the utility cart 10 is comprised of a shelf surface 22, 42, and 62, and a surrounding framework 24, 44, and 64. The shelving surface is constructed of an open corrugated pattern 23, 43, and 63 for better ventilation, and to allow for greater visibility of stored products. The top shelf 20 and bottom shelf 40 have a quadrilateral construction, whereby one pair of sidewall length is longer than the other. The top shelf includes a bottom surface 28 on the framework 24 which contains four open slots 30 on each corner of the framework 24. The open slots 30 are constructed and arranged to accept a top end 13 of a corner post 12. On the top surface 22 of the top shelf 20, the open slots 30 are closed off to prevent the corner posts from extending through the shelf Set screws 18 may be provided to secure each open slot 30 to a corresponding corner post 12, as shown in FIG. 5. Similarly, the bottom shelf 40 includes a top shelf surface 42 on the framework 44 which contains four open slots 50 on each corner of the framework 44. The open slots 50 are constructed and arranged to accept a bottom end 14 of the corner post 12. On the bottom surface 48 of the bottom shelf 40, the open slots 50 are closed to prevent the corner post from protruding through the shelf An ergonomic handle 100 is attached to the top shelf 20 to aid the user in pushing the cart. The handle 100 is attached to the shorter sidewall 26 on the frame 24 surrounding the top shelf 20. In the preferred embodiment, the handle 100 is fitted to extend along the shorter length of the top shelf 20. Shown in FIGS. 1 and 5, the top shelf 20 further includes a support member 90. The support member 90 resembles an arch 92 that attaches from one sidewall 26 on the framework 24 to opposite sidewall 26. The support member 90 provides multiple functions such as, hanging items thereon or maintaining larger items in an upright position. Additionally, several support members can be attached to the framework with a plastic covering to encase all the support members to create a mini-greenhouse or to protect the contents underneath from the elements outside, not shown.

Figure 4:
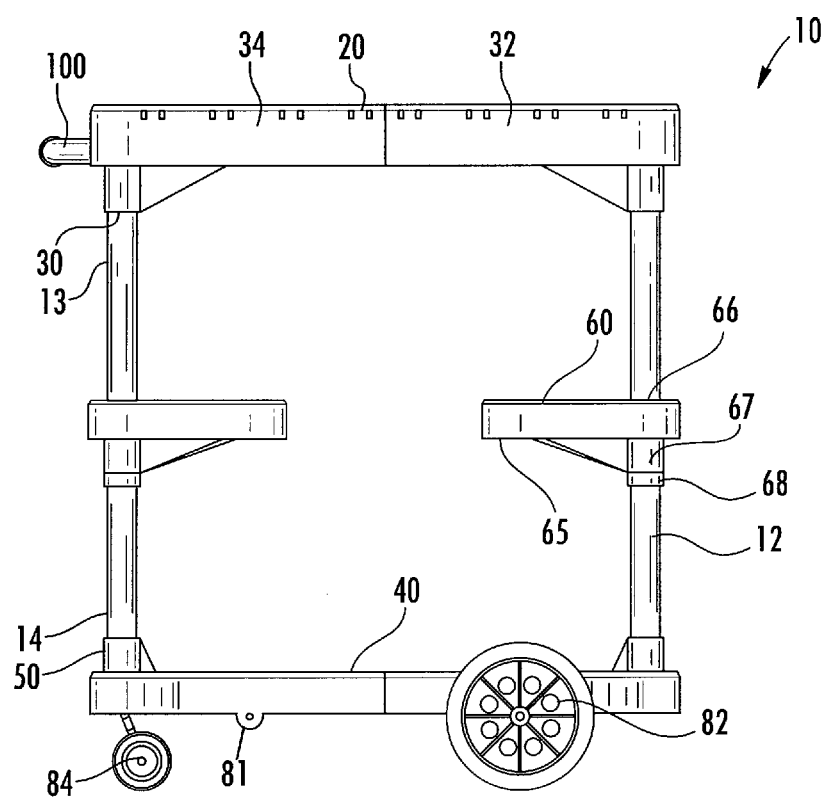
FIG. 4 is a side view of the instant invention.
Figure 5:
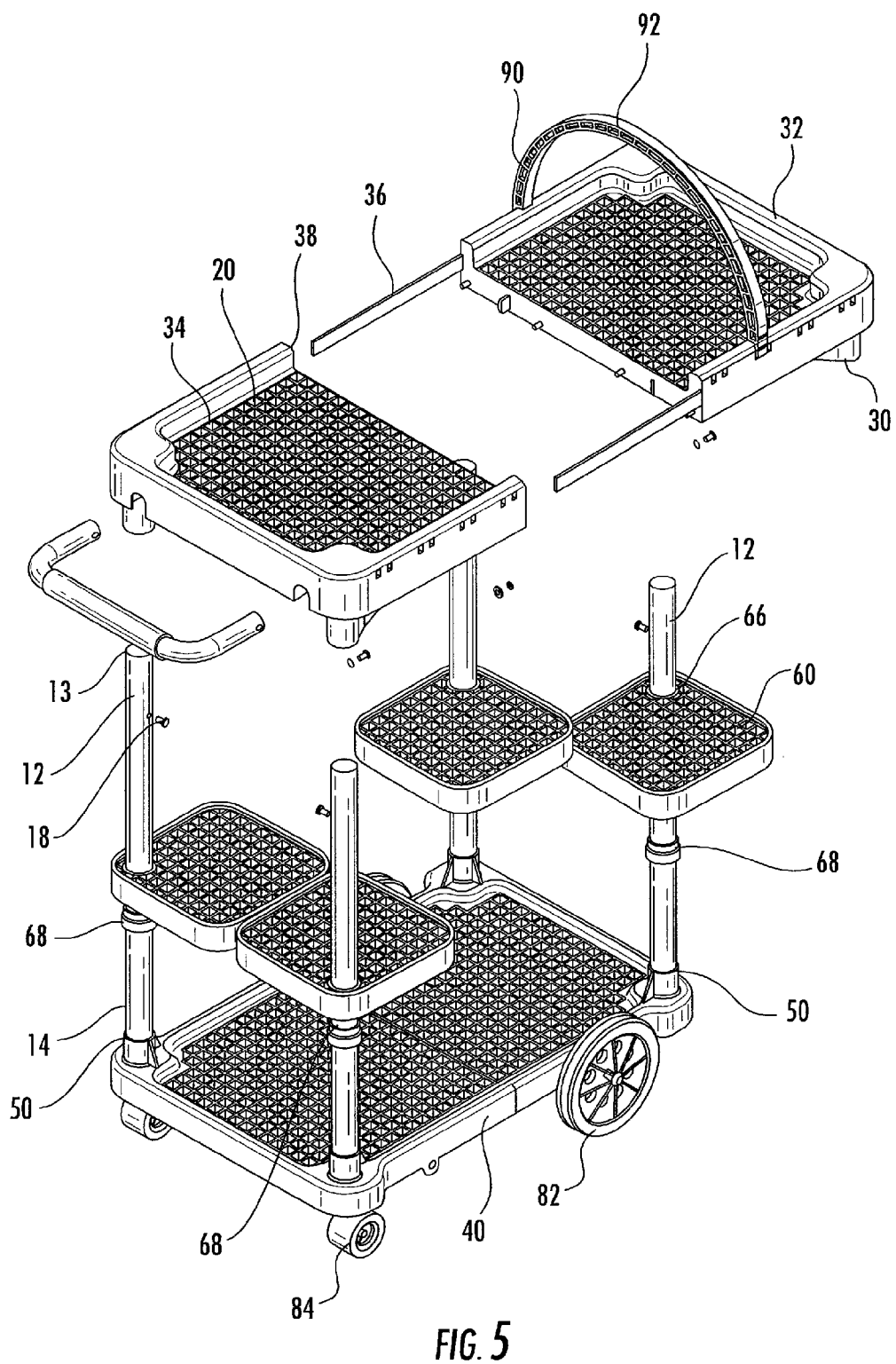
FIG. 5 is a partially exploded view of the instant invention.

As shown in FIGS. 2 and 4, each individual rotatable shelf 60 has a quadrilateral construction; however, dependent upon the embodiment, the rotatable shelf may have a pair of sidewall lengths that are longer than the opposite, or all sidewall lengths may be of similar length, not shown. Each rotatable shelf 60 includes an aperture 66 on one corner of the surrounding frame 64 that extends along from the top surface 62 to the bottom surface 65. The aperture 66 may extend past the bottom surface 65 of the shelf 60 for stability, as shown in FIG. 4, to form an extended aperture 67. The aperture 66 and extended aperture 67 are constructed and arranged to receive a corner post 12 therethrough. Collars 68 are provided for each corner post 12. The collars 68 provide a support for each individual rotatable shelf 60, whereby the collars 68 can be placed anywhere along the length of the corner post 12. When a desired placement for the shelf 60 is found, the collar 68 is secured to the corner post 12. Various securement means are contemplated for the collar 68. Set screws, clamps, or the like may be provided to secure the collar to the corner post, not shown. The various securement means will not inhibit the shelf from rotating about the post, so as not to depart from the scope of the invention. Each of the individually rotatably shelves 60 may be rotated and positioned as desired around a respective corner post 12 to allow the user to customize the cart. Furthermore, each individually rotatable shelf 60 extends beyond the end(s) of the cart in any direction.

As shown in FIG. 4, the utility cart includes a pair of caster wheels 80. The wheels may be in various arrangements, in terms of size, and can be secured to the bottom surface 48 of the bottom shelf 40 and corner posts 12 to allow the cart 10 to be easily moved or transported. Furthermore, each pair of wheels may be of different various sizes to provide ease in transportation of the cart. In a preferred embodiment, one pair of wheels 82 will have a larger radius than the other pair of wheels 84. However, it is contemplated that each pair of wheels may have the same radius. The pair of wheels having the larger radius 82 is attached to a pair of depending tab members 81 each having an aperture therethrough on the sidewall 46 of the bottom shelf frame 44. The pair of wheels having the smaller radius 84 is attached to the bottom surface 48 of the bottom shelf 40.

As shown in FIG. 5, the utility cart is easily assembled and disassembled without the use of complicated tools. For construction thereof, each corner post 12 is inserted into each corresponding open slot 50 on the bottom shelf 40. The open slots 50 are constructed and arranged to have a frictional relationship with the corner posts 12; however, for further stability set screws, clamps, or the like are contemplated, but not shown. The collars 68 are then placed at the desired length along the corner post 12 and then secured. Each corner post 12 is then inserted through the aperture 66 of a respective rotatable shelf 60 until reaching the collar 68. In a preferred embodiment, the top shelf 20 is provided as a two-piece shelf, each of the two pieces cooperating with each other to form a one-piece shelf; however, it is contemplated that the top shelf may come as a one-piece shelf. It is also contemplated that the bottom shelf be provided as a two piece shelf having a similar construction to the one described above for the top shelf. The cooperation between the first half of the top shelf 32 and the second half of the top shelf 34 includes a pair of elongated rigid members 36 extending from first half sidewall 26 of the frame 24 that is insertable into the corresponding opening 38 on the sidewall 26 of the second top shelf 34.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A utility cart comprising:
a top shelf, said top shelf including a top surface and a bottom surface, said bottom surface having at least four open slots each positioned on a corner portion of said bottom surface, each said open slot constructed and arranged to accept a top portion of a corner post;
at least four of said corner posts constructed as elongated cylindrical members;
a bottom shelf, said bottom shelf including a top surface and a bottom surface, said top surface having at least four open slots each positioned on a corner portion of said top surface, each said open slot constructed and arranged to accept a bottom portion of one said corner post;
at least two center shelves, each having a rectangular shape positioned between said top shelf and said bottom shelf along one of said at least four said corner posts, said at least two center shelves including an aperture positioned in a corner portion of said rectangular shape, said aperture sized to receive one of said at least four corner post members therethrough, said aperture sized to cooperate with said corner post to allow selective rotation and infinite positioning of said center shelves around said center posts, said rectangular shape sized so that said at least two center shelves can be positioned with edges of said rectangular shape adjacent with respect to each other to create a single shelf within the confines of said four corner posts and wherein said at least two center shelves can be positioned with edges of said rectangular shape spaced apart with respect to each other to create two shelves outside of the confines of said four corner posts.

2. The utility cart of claim 1 wherein said at least two center shelves are rectangular in shape, said rectangular shape sized so that said at least two center shelves can be positioned with edges of said rectangular shape adjacent with respect to each other to create a single shelf outside the confines of said four corner posts and wherein said at least two center shelves can be positioned with edges of said rectangular shape spaced apart with respect to each other to create two shelves inside of the confines of said four corner posts.

3. The utility cart of claim 1 wherein said utility cart includes four said center shelves, two of said center shelves positioned at a first end of said utility cart and two of said center shelves positioned at a second end of said utility cart, each said center shelf constructed and arranged to rotate about a separate corner post.

4. The utility cart of claim 3 wherein said four center shelves are rectangular in shape, said aperture positioned in a corner portion of said rectangular shape, said rectangular shape sized so that said two center shelves at said first end of said utility cart can be positioned with edges of said rectangular shape adjacent with respect to each other at to create a single shelf within the confines of said four corner posts and wherein said two center shelves at said first end of said utility cart can be positioned with edges of two said rectangular shaped shelves in a spaced apart relationship with respect to each other to create two shelves outside of the confines of said four corner posts and wherein edges of said two said rectangular shaped shelves at said second end of said utility cart can be positioned adjacent with respect to each other to create a single shelf inside of the confines of said four corner posts and wherein said two center shelves at said second end of said utility cart can be positioned with edges of two said rectangular shaped shelves in a spaced apart relationship with respect to each other to create two shelves outside of the confines of said four corner posts.

5. The utility cart of claim 3 wherein said four center shelves are rectangular in shape, said aperture positioned in a corner portion of said rectangular shape, said rectangular shape sized so that said two center shelves at said first end of said utility cart can be positioned with edges of said rectangular shape adjacent with respect to each other to create a single shelf within the confines of said four corner posts and wherein said two center shelves at said first end of said utility cart can be positioned with edges of two said rectangular shaped shelves in a spaced apart relationship with respect to each other to create a pair of shelves outside of the confines of said four corner posts and wherein edges of said two said rectangular shaped shelves at said second end of said utility cart can be positioned in a spaced apart relationship with respect to each other to create a pair of shelves outside of the confines of said four corner posts and wherein said two center shelves at said second end of said utility cart can be positioned with edges of two said rectangular shaped shelves in an adjacent relationship with respect to each other to create a single shelf outside of the confines of said four corner posts.

6. The utility cart of claim 1 including at least one collar member, each said collar member including an inner bore sized to fit around an outer diameter of said corner posts, one said collar positioned around said corner post to support said at least one center shelf.

7. The utility cart of claim 6 wherein said at least one collar member can be secured anywhere along the length of said corner post.

8. The utility cart of claim 6 wherein said bottom shelf includes four wheels secured thereto for rotation about an axle member.

9. The utility cart of claim 8 wherein said bottom surface of said bottom shelf includes a pair of depending tab members positioned proximate a second end of said utility cart, said depending tab members each including an aperture therethrough, said apertures sized to cooperate with an axle member, two of said wheels secured to said axle member for rotation, said bottom surface of said bottom shelf including a pair of caster wheels secured to a first end of said utility cart.

10. The utility cart of claim 8 wherein said top shelf includes a handle member, said handle member secured to a first end of said top shelf.

11. The utility cart of claim 10 wherein said top surface of said top shelf includes at least one arch shaped support member, said support member extending from a first side of said top shelf to a second side of said support shelf.

12. The utility cart of claim 11 wherein said top surface of said top shelf includes a plurality of said arch shaped support members.

13. The utility cart of claim 12 wherein said plurality of support members are constructed and arranged to support a plastic sheet member whereby said top shelf functions as a greenhouse.

14. The utility cart of claim 1 wherein said top shelf is constructed of two pieces.

15. The utility cart of claim 14 including a first elongated rigid member extending from a first top shelf half sidewall portion to a second top shelf half sidewall portion along a first side of said utility cart, a second elongated rigid member extending from said first top shelf half sidewall portion to said second top shelf half sidewall portion along a second side of said utility cart.

16. The utility cart of claim 1 wherein said bottom shelf is constructed of two pieces.

17. The utility cart of claim 16 including a third elongated rigid member extending from a first bottom shelf half sidewall portion to a second bottom shelf half sidewall portion along a first side of said utility cart, a fourth elongated rigid member extending from said first bottom shelf half sidewall portion to said second bottom shelf half sidewall portion along said second side of said utility cart.

\* \* \* \* \*